UNITED STATES PATENT OFFICE.

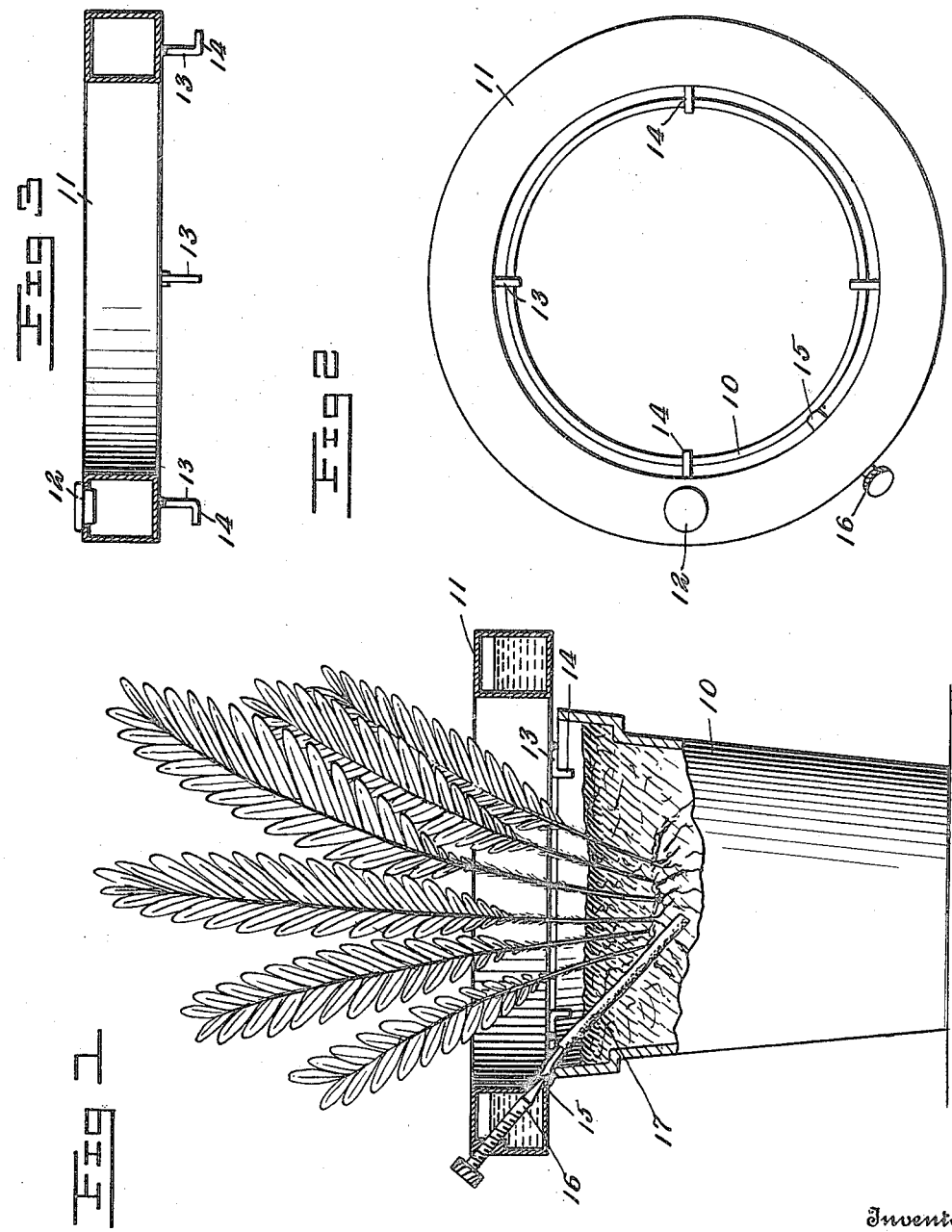

PAUL R. WEITZEL, 2D, OF PHILADELPHIA, PENNSYLVANIA.

WATERING ATTACHMENT FOR FLOWER-POTS.

1,231,975.   Specification of Letters Patent.   Patented July 3, 1917.

Application filed February 15, 1915. Serial No. 8,398.

*To all whom it may concern:*

Be it known that I, PAUL R. WEITZEL, 2d, a citizen of the United States, residing at Philadelphia and State of Pennsylvania, have invented new and useful Improvements in the Watering Attachment for Flower-Pots, of which the following is a specification.

This invention relates to watering devices for flowers, plants and the like contained in flower pots, and has for an object to provide a device for automatically and continuously feeding water to the flower pot at the desired flow; to provide a device which will distribute the water evenly in the flower pot without flooding the same; a device which may be quickly filled with water and adjusted so as to gradually feed the water to the earth in the flower pot, and does not require constant attention; and to provide a device which may be easily and quickly applied to flower pots and plants of various forms and sizes.

In carrying out the objects of this invention a water container of suitable shape is detachably placed on top of the flower pot, about the stem or trunk of the flower or plant, and the container is provided with an outlet opening controlled by a valve to permit water in the container to trickle or drop intermittently into the flower pot. A tubing or the like is preferably utilized in conveying the water delivered from the container to the middle portion of the flower pot to insure the even distribution of the water.

The above and other objects and advantages of this invention will be more clearly brought out in the following detail description of the present embodiment of the invention, the same being shown in the accompanying drawings wherein,—

Figure 1 is a vertical section through the upper end of a flower pot showing the improved watering device of this invention applied thereto.

Fig. 2 is a top plan view of the same.

Fig. 3 is a transverse section through the watering device taken through the filler opening.

Referring to these drawings, 10 designates a flower pot of any approved form adapted to contain a flower, plant, or the like. The watering device is made up of an annular hollow chamber 11 adapted to contain water admitted thereto through an opening in one side and at the top thereof closed by a cap 12.

The chamber or container 11 is provided on its underside, and at suitably spaced intervals thereabout, with supporting arms 13 preferably hinged to the container 11 and comprising arms having down turned outer ends forming lips 14. The arms 13 are adapted to be swung up into horizontal position, as shown in Fig. 1, and to rest upon the upper edge of the flower pot 10 with the lips or projections 14 extending down into the flower pot to hold the arms 13 from displacement. It is thus seen that the arms 13 hold the container 11 at the top of the flower pot 10 and about the edge thereof.

At one side, as is shown to advantage in Figs. 1 and 2, the container 11 is provided with an opening in its inner wall and at the bottom thereof about which is formed a valve seat 15 for the reception of a needle valve 16 extending diagonally through the container 11 and passing upwardly and outwardly through the upper outer edge of the container. The needle valve 16 is provided with a suitable head or the like on its outer end for engagement by the fingers, whereby to turn the valve 16 and control the passage of water from the container through the valve opening 15.

The valve 16 may be so adjusted as to permit of the intermittent dropping of the water from the container into the flower pot. If desired the container 11 may be provided with a tube 17, leading from the valve opening 15 to the middle portion of the flower pot 10, as shown to advantage in Fig. 1, so as to convey the dripping water to the roots of the flower or plant in the pot.

In the preferred form of the invention, shown in Figs. 1, 2 and 3, which is particularly adaptable to plants or flowers with a plurality of stems, substantially filling the upper end of the flower pot, the container 11 is placed on the ground or other suitable support and the flower pot 10 is seated within the container. The container 11 is now drawn upwardly about the flower pot 10 with the arms 13 hanging in the position shown in Fig. 3. When the container passes the upper edge of the flower pot 10 the arms 13 are swung inwardly and the container is lowered to engage the arms 13 and the lips 14 thereof with the upper edge of the flower pot 10, as shown in Fig. 1. The tube 17 may now be adjusted into the flower pot 10, and for this purpose is preferably of flexible material although it may be detached from the container 11 and applied thereto after the container is in place.

In the use of the invention the cap 12 is removed and water is poured in the container 11 to fill the same. The cap 12 is now replaced to prevent the evaporation of the water and the valve 16 is adjusted so as to admit of the dropping or trickling of the water into the flower pot from the tube 17, if desired.

With this device the container may be quickly filled with water and the valve adjusted and no further attention need be paid to the flower or plant until the container is to be again filled.

With the use of this watering attachment for flower pots considerable time is saved as in filling the container, and adjusting the valve, but a short time is required, and no further attention is necessary.

The water is automatically and gradually fed to the flower pot without flooding the same, and without continued attention on the part of the attendant.

It is of course understood that various changes may be made in the details of construction of this watering attachment for flower pots, and that the same may be used upon any receptacle or the like within which it is desired to gradually or slowly feed water, such changes being contemplated within the spirit of the invention, and being restricted only by the scope of the following claims.

What is claimed is—

1. A watering attachment for flower pots comprising an annular container adapted to hold a quantity of water and to receive downwardly therethrough a flower pot; a plurality of hinged arms on said container normally suspended beneath the container and out of line with the flower pot; said arms being adapted to be swung inwardly for engagement upon the upper edge of the flower pot when the latter is moved down through the same; depending lips on the inner ends of the arms for engagement over the edge of the flower pot to support the container against lateral displacement; and means for delivering water from the container to the flower pot.

2. A watering attachment for flower pots comprising an annular container adapted to receive a flower pot therethrough; supporting arms hinged upon the bottom of the container and adapted to be swung inwardly for engagement upon the upper edge of the flower pot to support the container; lips carried upon the inner ends of the arms for engagement over the edge of the flower pot to hold the container against lateral displacement; and adjustable means on the container for regulating the flow of water therefrom to the flower pot.

In testimony whereof I have hereunto set my hand in presence of two subscribing witnesses.

PAUL R. WEITZEL, 2.

Witnesses:
JOHN P. BARBER,
E. SADDINGTON.

Copies of this patent may be obtained for five cents each, by addressing the "Commissioner of Patents. Washington, D. C."